Patented Mar. 9, 1937

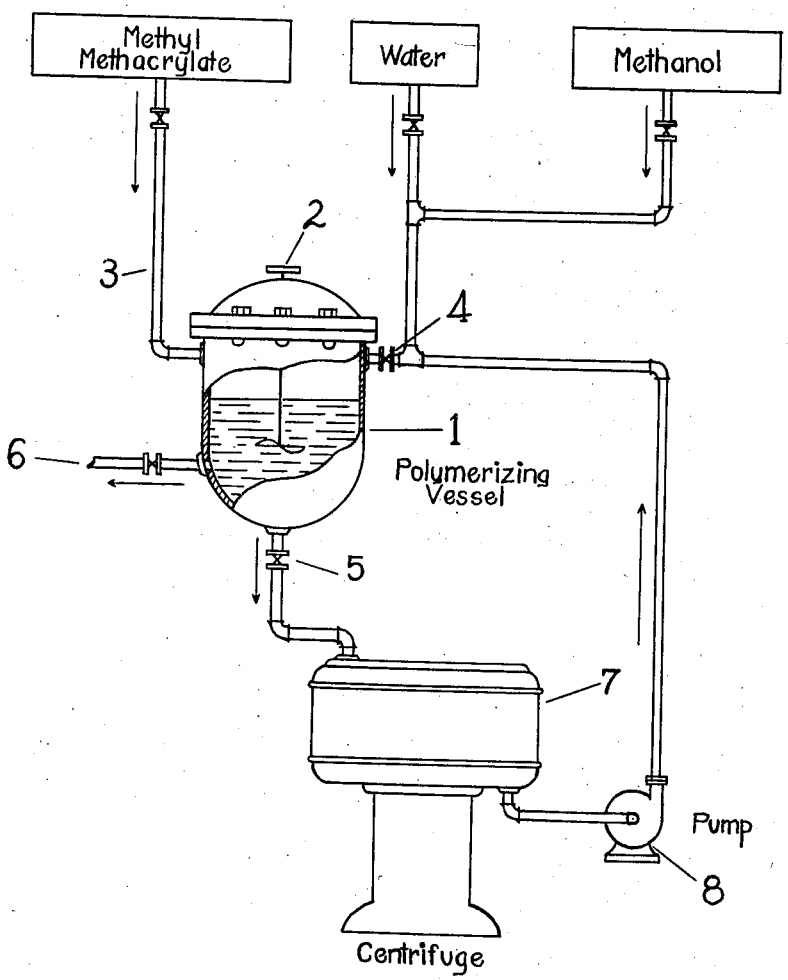

2,072,904

UNITED STATES PATENT OFFICE 2,072,904

POLYMERIZATION OF ORGANIC COMPOUNDS

Emil D. Ries, Wilmington, Del., assignor to E. I. du Pont de Nemours & Company, Wilmington, Del., a corporation of Delaware Application April 26, 1933, Serial No. 667,984

11 Claims. (Cl. 260—2)

This invention relates to the production of synthetic resinous bodies and particularly to an improved process for the manufacture of polymerization products of methyl methacrylate (methyl ester of alpha-methylacrylic acid), whereby the polymer is obtained in an easily recoverable form, particularly suited to subsequent processing and to employment thereof in the industrial arts.

The production of a new and valuable resin by polymerizing methyl methacrylate is described in the copending application of Rowland Hill, Ser. No. 641,113, filed November 3, 1932. When methyl methacrylate is subjected to polymerizing conditions, e. g. to the action of heat, light, and/or a polymerizing catalyst, the product obtained is generally in a form somewhat difficult of application to the arts. Thus, for example, if methyl methacrylate alone is maintained at a temperature of, say, from 60–100° C. for 24 hours or more, it gradually changes from a clear liquid to an equally clear glass-like solid mass. Because of the inherent characteristics of the product it is difficult to remove it from the polymerizing vessel and to reduce it to a comminuted form adapted for the preparation of molding compositions or solutions. On the other hand, when methyl methacrylate is polymerized in the presence of a solvent medium the product varies, depending upon the particular solvent employed, from a dense glass-like body, such as has just been referred to, to a white, tough and spongy mass which likewise adheres, although somewhat less tenaciously, to the polymerizing vessel and after removal therefrom is broken up only with difficulty.

It is the object of the invention to provide an improved process for polymerizing methyl methacrylate, yielding a product not subject to the objections above referred to.

Other objects and advantages of the invention will be apparent as it is being understood by reference to the following specification, in which its preferred embodiments are described, and to the accompanying drawing in which—

The figure is a diagrammatic representation of one arrangement of apparatus for the practice of the invention.

In accordance with the invention methyl methacrylate is polymerized in the presence of an aqueous medium comprising water together with one or more water-miscible organic solvents for monomeric methyl methacrylate. The amount of water used is the maximum quantity which, at the temperature selected for polymerizing, will yield a clear solution of monomer, organic solvent and water. In other words, the proportion of water is such, or substantially such, that, under the polymerizing conditions, addition of further water would render the solution cloudy by throwing monomeric methyl methacrylate out of solution. This mode of operation will for convenience hereinafter be referred to as working at the cloud point. By operating at the cloud point a product of greatly improved character is obtained. The polymer separates from the solution substantially as rapidly as formed and yields a relatively soft, mushy mass which is readily broken up, removed from the polymerizing vessel and subjected to filtration, drying, comminution, or other desired processing. While the invention is not limited to any explanation or theory thereof, it would appear that when the conditions above prescribed are observed the individual particles of polymer are kept constantly wetted with water, agglomeration of the polymer particles being thereby prevented.

It is to be understood it is not essential that the operation be conducted exactly at the cloud point but, of course, to attain the full benefit of the invention the proportion of water should be as near as practical to, while not exceeding, that corresponding to the cloud point. Any substantial excess of water over and above that corresponding to the cloud point value should, of course, be avoided, inasmuch as operation under these conditions precipitates monomer from the original mixture, the precipitated monomer thereafter polymerizing as a relatively dense, agglomerated mass.

Various organic solvents or mixtures thereof may be employed in association with the water to form the polymerizing medium, it being understood that the organic solvent or solvents chosen should be water-miscible. Among the solvents that have been found available for the purpose are the water-soluble monohydric aliphatic alcohols, such as methanol, ethanol, and propanol; low-boiling derivatives of the polyhydric alcohols, such as alkyl ethers of ethylene and diethylene glycol; water soluble ketones, such as dimethyl and methyl-ethyl ketones; and water soluble organic acids, such as formic, acetic and propionic acid. Preferably the solvent used should be of such boiling point characteristics, as to facilitate subsequent removal from the polymer at a temperature not exceeding that at which the polymer begins to flow or sinter. From this and other considerations, including cheapness and ready availablity, I have found methanol to be especially useful.

I have found that the best results, particularly with respect to ease of removal from the polymerizing vessel, are obtained when the proportion of monomer to total volume of monomer, water and organic solvent is not in excess of 22% by volume.

It is to be understood that while the invention is particularly applicable to the polymerization of methyl methacrylate by the simple application of heat, the use of other polymerizing agents, either alternatively or additionally, as, for instance, light (especially ultra-violet light), and/or catalysts such, for example, as benzoyl peroxide, is included within the scope of the invention.

As a further and related feature of the invention I have found that the process hereinbefore described makes possible the efficient polymerization of methyl methacrylate in a continuous manner, as opposed to the batch method ordinarily employed for operations of this character. In accordance with this aspect of the invention, I may effect the polymerization of methyl methacrylate by initially preparing solutions of methyl methacrylate, water, and an organic solvent, such as methanol, the proportions being such as correspond to cloud point conditions. This solution is introduced into a polymerizing vessel which may be any convenient tank or kettle adapted for the maintenance of the desired temperature, and provided with means for continuous addition of monomer, water, and solvent as well as means for continuous withdrawal from the vessel of the mixture after polymerization. After introduction into the vessel the materials are heated to a temperature of, say, 60–100° C., the mixture being continuously agitated. When substantial polymerization has occurred, but before it has reached a point where the reaction mixture can only with difficulty be pumped through pipes, the mushy mixture of polymer and solvent medium is continuously withdrawn from the vessel and conveyed to a filter or other suitable device for separating the solid polymer from the polymerizing medium and any unconverted monomer, this separation being effected at the polymerizing temperature. The filtered polymer may then be washed free of solvent and monomer and dried. The liquid separated in the filtering or equivalent operation is then returned to the polymerizing vessel and the polymerization is thereafter continuously carried on by adding to the vessel recirculated polymerizing medium and fresh monomer in such proportions as will continuously maintain in the reaction vessel the proportions originally prescribed. Due to operating losses small quantities of fresh polymerizing medium will have also to be added. In initiating the process the time required for effecting sufficient separation of polymer from the reaction mixture to warrant commencement of circulation can be shortened by beginning addition of fresh monomer as soon as separation of polymer has started. This addition is thereafter continued at such a rate as to maintain the mixture at the cloud point.

The continuous process has the important advantage that by operating in the manner indicated the solution undergoing polymerization can readily be kept at the cloud point, whereas in batch operation as soon as some monomer polymerizes and precipitates the solution is again below the cloud point.

While it will be understood that the invention is susceptible of wide variation, particularly as regards proportions, specific materials, and conditions of operation, the following examples will illustrate more specifically how the invention may be practiced.

*Example 1.*—A mixture of 37 parts by volume of methanol, 53 parts water, and 10 parts methyl methacrylate, is heated for 96 hours at 65° C. in a closed vessel. At the end of that time the polymerization is complete and the polymer is obtained in the form of a soft, white sponge which is readily shaken or broken up. The whole mass, including polymer and polymerizing medium, is removed from the polymerizing vessel, filtered, washed with methanol, and dried for 3 hours at 20° C., and 3 hours at 120–140° C. The more or less granular material can readily be broken up or powdered or converted into solutions.

*Example 2.*—Referring to the drawing, a continuous process for polymerizing methyl methacrylate is effected in a closed and steam-jacketed kettle (1) provided with a stirrer (2) and with two valved inlets (3) and (4) for introduction of monomer and polymerizing medium, respectively, and a valved discharge at the bottom. Into this vessel is introduced initially a mixture of 10 parts by volume methyl methacrylate, 40 parts methanol, and 50 parts water. The contents of the vessel are gradually heated to 65° C., with stirring, samples being taken at frequent intervals, thru the sampling outlet (6) to determine when separation of polymer has begun. When such separation is observed addition of fresh monomer through (3) is begun and continued thereafter so as to maintain the mixture (1) at the cloud point. When substantial polymerization has been effected, and while the mixture is still fluid enough to permit circulation, the valve (5) is partially opened and the product withdrawn to the centrifuge or filter (7). The solid polymer then separated is thereafter washed and dried as in Example 1. The filtrate is returned via pump (8) to the reaction vessel (1) together with such portions of fresh monomer and fresh mixture of methanol and water as to maintain the initial composition of the mixture undergoing polymerization. The cycle thus established is thereafter maintained.

It will be understood that it is imposible to prescribe in advance, for all conditions of operation and for all solvents and combinations of solvents, the specific proportions of water to solvent required for operation at the cloud point. This value will depend upon various factors including the specific solvent used, the temperature of polymerization, and the proportion of monomer to polymerization medium. The required value for any particular set of conditions can readily be ascertained by simple test.

Various changes may be made in the method hereinbefore described without departing from the invention or sacrificing any of the advantages thereof.

I claim:

1. Process of polymerizing methyl methacrylate which comprises subjecting to polymerizing conditions a clear solution of methyl methacrylate, water, and a water-miscible organic solvent, the solution containing the maximum quantity of water, which at the temperature of polymerization will yield a clear solution of the monomeric methyl methacrylate.

2. Process of polymerizing methyl methacrylate which comprises subjecting to polymerizing conditions a clear solution of methyl methacrylate, water, and a water soluble monohydric aliphatic alcohol, the solution containing the maximum quantity of water, which at the temperature of polymerization will yield a clear solution of the monomeric methyl methacrylate.

3. Process of polymerizing methyl methacrylate which comprises subjecting to polymerizing conditions a clear solution of methyl methacrylate, water, and methanol, the solution containing the maximum quantity of water, which at the temperature of polymerization will yield a clear solution of the monomeric methyl methacrylate.

4. Process as in claim 1 in which the methyl methacrylate is not more than 22% by volume of the total volume of methyl methacrylate, water, and organic solvent.

5. Process as in claim 1 in which the polymerization is effected by continuously withdrawing at least partially polymerized reaction mixture from the polymerization zone, separating solid polymer therefrom and returning the separated water-solvent mixture to the polymerizing zone together with fresh methyl methacrylate.

6. Process as in claim 2 in which the polymerization is effected by continuously withdrawing at least partially polymerized reaction mixture from the polymerization zone, separating solid polymer therefrom and returning the separated water-solvent mixture to the polymerizing zone together with fresh methyl methacrylate.

7. Process as in claim 3 in which the polymerization is effected by continuously withdrawing at least partially polymerized reaction mixture from the polymerization zone, separating solid polymer therefrom and returning the separated water-solvent mixture to the polymerizing zone together with fresh methyl methacrylate.

8. In a process for the polymerization of methyl methacrylate the step which comprises subjecting to polymerizing conditions monomeric methyl methacrylate, dissolved in a solvent mixture comprising water and a water miscible organic solvent, the water being present in amount just short of that necessary to give a cloudy solution.

9. In a process for the polymerization of methyl methacrylate the step which comprises subjecting to polymerizing conditions monomeric methyl methacrylate, dissolved in a solvent mixture comprising water and water soluble monohydric aliphatic alcohol, the water being present in amount just short of that necessary to give a cloudy solution.

10. In a process for the polymerization of methyl methacrylate the step which comprises subjecting to polymerizing conditions monomeric methyl methacrylate, dissolved in a solvent mixture comprising water and methanol, the water being present in amount just short of that necessary to give a cloudy solution.

11. A process for the polymerization of methyl methacrylate which comprises polymerizing approximately 10 parts of methyl methacrylate dissolved in approximately 37 parts of methanol and approximately 53 parts of water at a temperature of about 65° C.

EMIL D. RIES.